United States Patent
Igarashi

(10) Patent No.: US 10,999,479 B1
(45) Date of Patent: May 4, 2021

(54) COMMUNICATION DEVICE, COMMUNICATION SYSTEM, COMMUNICATION METHOD, AND RECORDING MEDIUM

(71) Applicants: Kabushiki Kaisha Toshiba, Tokyo (JP); Toshiba Electronic Devices & Storage Corporation, Tokyo (JP)

(72) Inventor: Atsushi Igarashi, Kawasaki Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 16/998,327

(22) Filed: Aug. 20, 2020

(30) Foreign Application Priority Data

Mar. 3, 2020 (JP) .............................. JP2020-036075

(51) Int. Cl.
*H04N 5/04* (2006.01)
(52) U.S. Cl.
CPC ..................................... *H04N 5/04* (2013.01)
(58) Field of Classification Search
CPC .. H04N 5/04; H04N 5/06; H04N 5/10; H04N 5/126; H04N 5/123; H04N 5/12
USPC ....... 348/515, 500, 512, 513, 521, 524, 536, 348/537, 547, 572, 573; 375/354, 362, 375/373, 376
See application file for complete search history.

(56) References Cited

U.S. PATENT DOCUMENTS

| | | | |
|---|---|---|---|
| 6,115,075 A | * | 9/2000 | Yoneno ..................... G09G 3/20 348/537 |
| 6,987,947 B2 | | 1/2006 | Richenstein et al. |
| 7,076,204 B2 | | 7/2006 | Richenstein et al. |
| 7,233,769 B2 | | 6/2007 | Richenstein et al. |
| 7,359,671 B2 | | 4/2008 | Richenstein et al. |
| 7,603,080 B2 | | 10/2009 | Richenstein et al. |
| 7,937,118 B2 | | 5/2011 | Coutinho et al. |
| 8,208,654 B2 | | 6/2012 | Coutinho et al. |
| 8,290,173 B2 | | 10/2012 | Richenstein et al. |
| 9,252,900 B2 | | 2/2016 | Poulsen |
| 9,451,313 B2 | | 9/2016 | Hutchings et al. |
| 9,461,812 B2 | | 10/2016 | Poulsen |
| 9,479,275 B2 | | 10/2016 | Poulsen |
| 9,672,177 B2 | | 6/2017 | Poulsen |

(Continued)

FOREIGN PATENT DOCUMENTS

| | | |
|---|---|---|
| JP | 4322680 B2 | 9/2009 |
| JP | 6013596 B2 | 10/2016 |

(Continued)

*Primary Examiner* — Sherrie Hsia
(74) *Attorney, Agent, or Firm* — David Tennant

(57) ABSTRACT

A communication device according to an embodiment includes: a processor configured to execute a media clock for generating a frame synchronization signal having a frequency which is m times a sampling frequency; a first interface configured to output 2m-channel audio data to a DAC or receive an input of the 2m-channel audio data from an ADC, in synchronization with the frame synchronization signal; and an external counter configured to generate a frequency-divided frame synchronization signal obtained by 1/m-frequency division of the frame synchronization signal and output the frequency-divided frame synchronization signal to the DAC and the ADC.

13 Claims, 7 Drawing Sheets

(56) References Cited

U.S. PATENT DOCUMENTS

| | | | |
|---|---|---|---|
| 10,250,376 B2 | 4/2019 | Hooper et al. | |
| 2006/0072040 A1* | 4/2006 | Osawa | H04N 5/08 |
| | | | 348/572 |

FOREIGN PATENT DOCUMENTS

| | | | |
|---|---|---|---|
| JP | 6245795 B2 | 12/2017 |
| JP | 6466487 B2 | 2/2019 |
| JP | 6603105 B2 | 11/2019 |

* cited by examiner

COMMUNICATION DEVICE, COMMUNICATION SYSTEM, COMMUNICATION METHOD, AND RECORDING MEDIUM

CROSS-REFERENCE TO RELATED APPLICATIONS

This application is based upon and claims the benefit of priority from the prior Japanese Patent Application No. 2020-036075 filed in Japan on Mar. 3, 2020, the entire contents of which are incorporated herein by reference.

FIELD

Embodiments described herein relate generally to a communication device, a communication system, a communication method, and a recording medium that input and output audio data of a plurality of channels via an Ethernet line.

BACKGROUND

An AVB (audio video bridging) network system, for example, has been used in an in-vehicle infotainment system. The AVB network system uses an Ethernet line and transfers video data, audio input/output data, and warning data using an Ethernet (registered trademark, the same shall apply hereinafter) frame.

However, in the in-vehicle infotainment system, there is a tendency that not only the amount of video data to be handled but also the amount of audio data to be handled increases. Therefore, a system using a TDM (time-division multiplexing) interface (TDM I/F) capable of transferring 8-channel data or 16-channel data per line has been commercialized.

On the other hand, an example of an interface for audio data includes I2S (inter-IC sound) interface (I2S I/F) used to serially transfer digital audio data between ICs. Since the I2S interface can transfer data of at most 2 channels (specifically, L channel and R channel in 2-channel stereo) per line, it is difficult to handle multi-channel audio data only with the I2S interface.

DETAILED DESCRIPTION

A communication device according to an embodiment includes: a processor configured to execute a media clock for generating a frame synchronization signal having a frequency which is m times a sampling frequency of audio data; a first interface configured to output 2m-channel audio data to a digital-to-analog converter (DAC) or receive an input of the 2m-channel audio data from an analog-to-digital converter (ADC), in synchronization with the frame synchronization signal; and an external counter configured to receive the frame synchronization signal from the processor, generate a frequency-divided frame synchronization signal obtained by 1/m-frequency division of the frame synchronization signal, and output the frequency-divided frame synchronization signal to the DAC and the ADC, in which m is an integer of 2 or more.

Embodiments will be described below with reference to the drawings.

First Embodiment (Configuration)
[1] System Configuration

Figure 1:
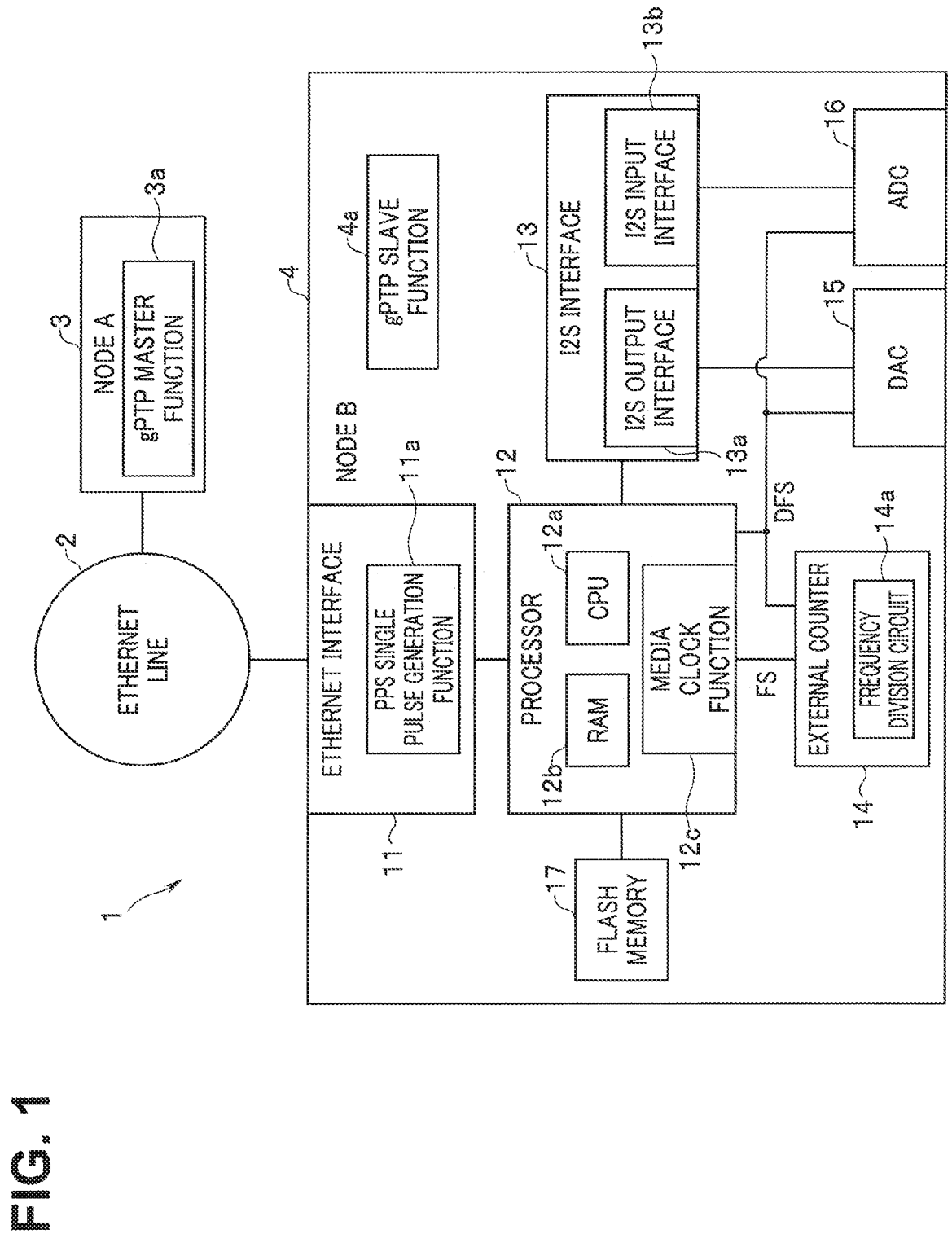
FIG. 1 depicts a functional block of a communication system according to a first embodiment.

First, a functional configuration of a communication system of the present embodiment will be briefly described. FIG. 1 is a configuration diagram showing functional blocks of the communication system according to the present embodiment.

A communication system 1 has a PPS (pulse per second) function, and is, for example, an AVB (audio video bridging) network system mounted in a vehicle. An example is described in which the communication system 1 is applied to an in-vehicle infotainment system. However, the present embodiment is not limited to the example, but may be applied to an infotainment system for an airplane or a ship.

The communication system 1 is a communication system using IEEE 802.3 that is a wired Ethernet communication standard. The communication system 1 includes a node A3 and a node B4 connected to each other via an Ethernet line 2, and can transmit and receive audio data and video data between the node A3 and the node B4. However, the communication system 1 may be an audio communication system that transmits and receives audio data. In the following description, transmission and reception of audio data will be mainly given, and transmission and reception of video data will be omitted.

As a time synchronization function, the node A3 has a gPTP (generic precision time protocol) master function 3a and the node B4 has a gPTP slave function 4a.

After the communication system 1 is activated, the node A3 and the node B4 performs gPTP clock synchronization processing according to a gPTP protocol defined in IEEE 802.1AS, for example. Thus, the node A3 and the node B4 enter a state where gPTP clocks are synchronized.

The node A3 is a communication device including an Ethernet interface and a processor as in the node B4 to be described below, but a detailed configuration will not be described.

The node B4 is a communication device including an Ethernet interface 11 (a second interface), a processor 12, an I2S (inter-IC sound) interface (I2S I/F) 13 (a first interface), an external counter 14, a digital-to-analog converter (DAC) 15, an analog-to-digital converter (ADC) 16, and a flash memory 17.

The Ethernet interface 11 receives and transmits an AVTP (audio video transport protocol) frame (defined in IEEE 1722) including audio data via the Ethernet line 2.

Figure 2:
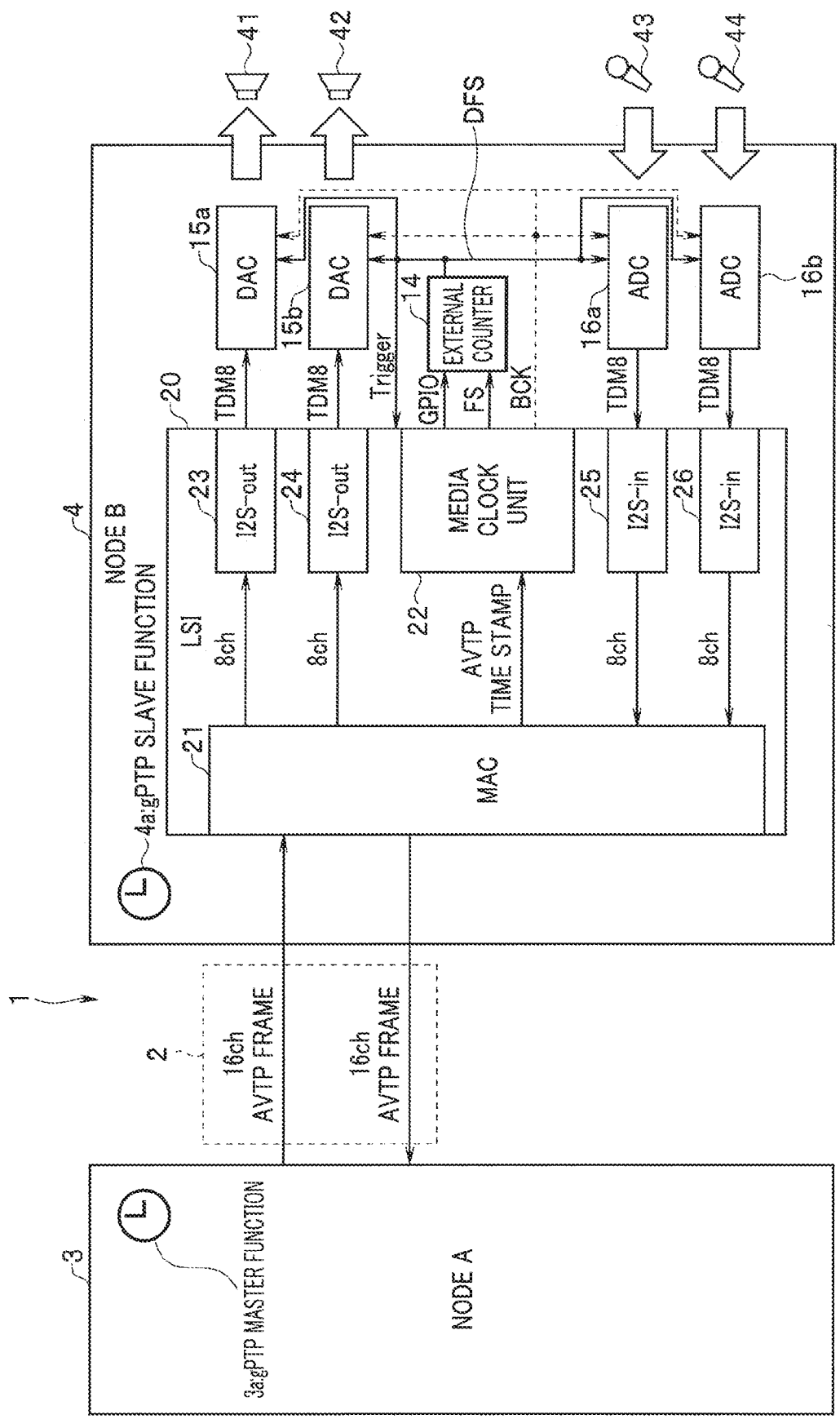
FIG. 2 depicts a configuration example of a node B in the communication system according to the first embodiment.

The Ethernet interface 11 receives the AVTP frame from the node A3, depacketizes the AVTP frame, and extracts audio data (audio 16-channel data in an example shown in FIG. 2).

In addition, the Ethernet interface 1 packetizes the audio data received from the ADC 16 via the I2S interface 13 to generate an AVTP frame, and transmits the generated AVTP frame to the node A3.

Thus, the node B4 has a listener function of receiving audio data via the Ethernet line 2 and a talker function of transmitting audio data via the Ethernet line 2.

The Ethernet interface 11 has a PPS single pulse generation function 11a of generating a single pulse at a time set in an internal register, with PPS (pulse per second) as a reference. Here, since the PPS is a pulse wave generated once per second with extremely high accuracy, a PPS single pulse generated, with the PPS as a reference, is also a pulse having high accuracy.

The PPS single pulse generated by the PPS single pulse generation function 11a is used as a trigger for PPS interrupt processing to be performed by the processor 12. Since the PPS interrupt processing includes two types of interrupt processing for outputting audio data and interrupt processing for inputting audio data, two (or two or more) internal registers for the PPS single pulse generation function 11a are provided, and generates at least a first PPS single pulse P1 for output and a second PPS single pulse P2 for input.

The processor 12 includes a CPU (central processing unit) 12a, a RAM (random access memory) 12b, and a media clock function 12c, and is configured as an LSI (large scale integration), for example (see a configuration example in FIG. 2).

The processor 12 reads a processing program stored in the flash memory 17, which will be described below, expands the program in the RAM 12b, and allows the CPU 12a to perform the processing according to the processing program stored in the RAM 12b, thereby realizing various functions as software control of a computer. The processor 12 may be configured to realize various functions by an electronic circuit such as FPGA (field programmable gate array).

The media clock function 12c is one of software control blocks realized by the processor 12. After the above-described gPTP clock synchronization processing is performed, media clock synchronization using a CRF (clock reference format) frame is executed by the media clock function 12c. Thus, the node A3 and the node B4 enter a state where the media clock is also synchronized.

It is assumed that the gPTP clock synchronization processing and the media clock synchronization processing using the CRF frame are regularly executed and the gPTP clock and the media clock are in a state of being always synchronized between the node A3 and the node B4.

The processor 12 buffers, in the RAM 12b, the audio data extracted by the Ethernet interface 11. Further, the processor 12 buffers, in the RAM 12b, the audio data received from the ADC 16 via the I2S interface 13.

The media clock function 12c receives an AVTP time stamp included in the AVTP frame. Then, the media clock function 12c generates a frame synchronization signal FS having a frequency that is m (m is an integer of 2 or more) times a sampling frequency (also referred to as sampling rate) of the audio data. The frame synchronization signal FS is a so-called LR clock that distinguishes an L channel and an R channel in 2-channel stereo audio data in the I2S interface 13.

The processor 12 inputs and outputs audio data of 2m-channel per line to and from the I2S interface 13 in a predetermined channel order in synchronization with the frame synchronization signal FS.

The I2S interface 13 includes an I2S output interface 3a and an I2S input interface 13b.

The I2S output interface 13a outputs the 2m-channel audio data read from the RAM 12b to the DAC 15 in a predetermined channel order, in synchronization with the frame synchronization signal FS from the processor 12.

The I2S input interface 13b receives an input of the 2m-channel audio data from the ADC 16 in a predetermined channel order, in synchronization with the frame synchronization signal FS from the processor 12, and outputs the received data to the processor 12. The processor 12 buffers the received 2m-channel audio data in the RAM 12b.

The external counter 14 includes a frequency division circuit 14a. The external counter 14 receives the frame synchronization signal FS from the processor 12, and generates a frequency-divided frame synchronization signal DFS obtained by 1/m-frequency division of the frame synchronization signal FS from the frequency division circuit 14a. The frequency division value of 1/m of the frequency division circuit 14a may be changeable according to the control of the processor 12. Then, the external counter 14 outputs the generated frequency-divided frame synchronization signal DFS to the DAC 15 and the ADC 16 and feedbacks the generated frequency-divided frame synchronization signal DFS to the processor 12.

The digital-to-analog converter (DAC) 15 converts the audio data output from the I2S output interface 13a to an analog signal from a digital signal.

The analog-to-digital converter (ADC) 16 converts audio data input from microphones 43 and 44 (see FIG. 2), which will be described below, to a digital signal from an analog signal and outputs the converted signal to the I2S input interface 13b.

The flash memory 17 stores, in a nonvolatile manner, a processing program for causing the processor 12 to perform a process and realize a communication method.

[2] Configuration of Node B4

FIG. 2 is a diagram showing a configuration example of the node B4 in the communication system 1. FIG. 2 shows an example in which m=4 (m may be any integer of 2 or more).

In the example shown in FIG. 2, a 16-channel (16 ch) AVTP frame is transmitted/received between the node A3 and the node B4 via the Ethernet line 2.

The node B4 includes an LSI 20 including functions of an Ethernet interface 11, a processor 12, and an I2S interface 13. Further, the node B4 includes the external counter 14 described above. DACs 15a and 15b corresponding to the DAC 15 described above, and ADCs 16a and 16b corresponding to the ADC 16 described above (note that the flash memory 17 is not shown in FIG. 2).

The LSI 20 includes a MAC (medium access control) 21, a media clock unit 22, I2S output units (I2S-out) 23 and 24, and I2S input units (I2S-in) 25 and 26.

The MAC 21 is located between a data link layer and a physical layer of the Ethernet and corresponds to the Ethernet interface 11 described above. The MAC 21 transmits the AVTP time stamp extracted by depacketizing the AVTP frame to the media clock unit 22.

In addition, the MAC 21 depacketizes the AVTP frame and extracts 16-channel audio data. Here, the extracted 16-channel audio data is buffered in the RAM 12b, the 8-channel audio data is transmitted to the I2S output unit 23 in a predetermined channel order to be described below, and the remaining 8-channel audio data is transmitted to the I2S output unit 24 in a predetermined channel order to be described below.

The 8-channel audio data received from the I2S input unit 25 in the predetermined channel order and the 8-channel audio data received from the I2S input unit 26 in the predetermined channel order are buffered in the RAM 12b. The MAC 21 packetizes the 16-channel audio data buffered in the RAM 12b into the AVTP frame, and transmits the data to the node A3 via the Ethernet line 2.

The media clock unit 22 corresponds to the media clock function 12c described above. The media clock unit 22 receives the AVTP time stamp from the MAC 21. Then, the media clock unit 22 generates a frame synchronization signal FS (LR clock) having a frequency of m (m is an integer of 2 or more) times the sampling frequency of the audio data, and transmits the generated frame synchronization signal to the external counter 14. The frame synchronization signal FS generated by the media clock unit 22 is used as a synchronization signal of the I2S output units 23 and 24 and the I2S input units 25 and 26.

The media clock unit 22 is further configured to output a bit clock BCK to the DACs 15a and 15b and the ADCs 16a and 16b. Hem, the bit clock BCK is serial data for synchronizing the audio data in unit of one bit.

The I2S output units 23 and 24 correspond to the I2S output interface 13a described above. The two I2S output units 23 and 24 are provided so as to correspond to two output lines in the configuration of FIG. 2.

The I2S input units 25 and 26 correspond to the I2S input interface 13b described above. The two I2S input units 25 and 26 are provided so as to correspond to two input lines in the configuration of FIG. 2.

Although the two input lines and two output lines are described as an example, the number of input lines and the number of output lines may be 1 or 3 or more.

The external counter 14 is configured as an external logic separate from the LSI 20 as shown in FIG. 2, for example. In other words, since the external counter 14 is not incorporated in the LSI 20, it is not necessary to significantly change the design of the LSI 20.

When m=4 as shown in FIG. 2, the external counter 14 generates a frequency-divided frame synchronization signal DFS obtained by ¼-frequency division of the frame synchronization signal FS from the processor 12, outputs the frequency-divided frame synchronization signal DFS to the DACs 15a and 15b and the ADCs 16a and 16b, and feedbacks the frequency-divided frame synchronization signal DFS to the processor 12 as a trigger signal (trigger).

The external counter 14 is connected to the LSI 20 via a GPIO interface (general purpose input/output interface). The external counter 14 is configured to be capable of clearing and resetting the counter under the control of the LSI 20 via the GPIO interface. Further, as described above, the frequency division value 1/m of the frequency division circuit 14a in the external counter 14 may be changeable by the control of the LSI 20 via the GPIO interface.

Figure 3:
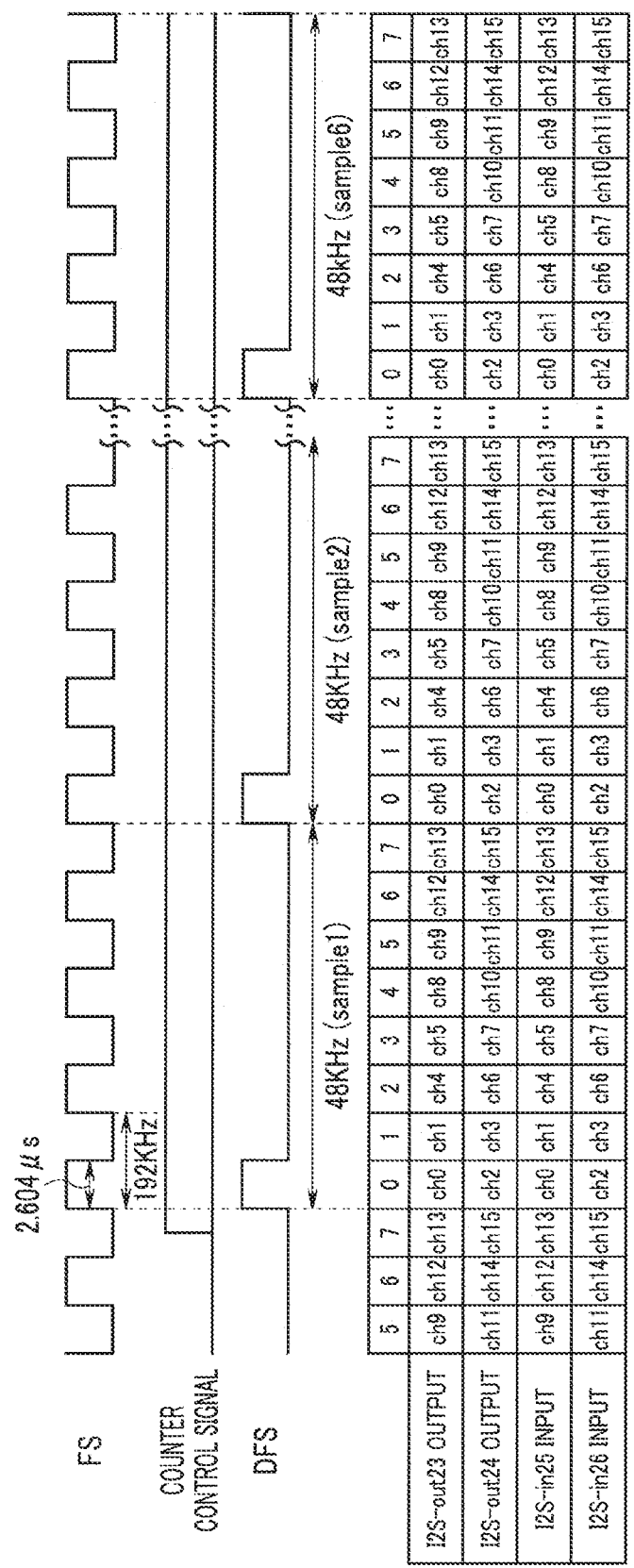
FIG. 3 depicts a timing chart showing a state when 16-channel audio data is input/output from an I2S interface according to the first embodiment.

FIG. 3 is a timing chart showing a state when the 16-channel audio data is input/output from the I2S interface 13.

FIG. 3 shows an example in which m=4 and the sampling frequency is 48 [KHz], as shown in FIG. 2. In this case, the processor 12 sets the frame synchronization signal FS to 48 [KHz]×4=192 [KHz], and supplies the signal to the external counter 14.

The external counter 14 performs 1/m-frequency division (here, ¼-frequency division) of the received frame synchronization signal FS to generate a frequency-divided frame synchronization signal DFS, and supplies the frequency-divided frame synchronization signal DFS of 48 [KHz] to the DACs 15a and 15b and the ADCs 16a and 16b. Further, the external counter 14 feedbacks the frequency-divided frame synchronization signal DFS to the processor 12 as a trigger signal (trigger).

The 16-channel audio data of channel 0 (ch0) to channel 15 (ch15) buffered in the RAM 12b is synchronized with the frame synchronization signal FS generated by the media clock unit 22, and is output from the I2S output units 23 and 24 in the order according to TDM (time-division multiplexing) shown in FIG. 3.

More specifically, the frame synchronization signal FS is a pulse wave in which a cycle is, for example, 5.208 [μs] and a high level and a low level alternate every 2.604 [μs]. In synchronization with such a frame synchronization signal FS, audio data (audio data corresponding to a bit depth, for example, 16-bit audio data) for 1 channel (1 sampling) is output every 2.604 [μs] from the I2S output units 23 and 24.

Accordingly, for example, audio data of 1 sampling for each of ch0, ch1, ch4, ch5, ch8, ch9, ch12, and ch13 is output from the I2S output unit 23 every cycle 48 [KHz] of the frequency-divided frame synchronization signal DFS, and audio data of 1 sampling for each of ch2, ch3, ch6, ch7, ch10, ch11, ch14, and ch15 is output from the I2S output unit 24.

The DAC 15a converts the audio data input from the I2S output unit 23 into an analog signal from a digital signal in synchronization with the frequency-divided frame synchronization signal DFS and the bit clock BCK, and outputs the converted data to a speaker 41, for example.

The DAC 15b converts the audio data input from the I2S output unit 24 into an analog signal from a digital signal in synchronization with the frequency-divided frame synchronization signal DFS and the bit clock BCK, and outputs the converted data to a speaker 42, for example.

The ADC 16a converts the audio data input from the microphone 43 into a digital signal from an analog signal in synchronization with the frequency-divided frame synchronization signal DFS and the bit clock BCK, and outputs the converted data to the I2S input unit 25 in the order according to the TDM as shown in FIG. 3.

ADC 16b converts the audio data input from the microphone 44 into a digital signal from an analog signal in synchronization with the frequency-divided frame synchronization signal DFS and the bit clock BCK, and outputs the converted data to the I2S input unit 26 in the order according to the TDM as shown in FIG. 3.

The audio data of the 16 channels in total input to the I2S input units 25 and 26 is buffered in the RAM 12b, and is packetized into the AVTP frame to be transmitted by the MAC 21 as described above.

When the audio data of the 16 channels in total is output from the I2S output units 23 and 24 and the audio data of the 16 channels in total is input to the I2S input units 25 and 26, the audio data of the channel 0 (ch0) is input and output in synchronization with the frequency-divided frame synchronization signal DFS fed back to the processor 12 from the external counter 14.

A counter control signal is transmitted from the LSI 20 via the GPIO interface before the input/output of the audio data of the channel 0, the counter of the external counter 14 is cleared/reset in response to the rising of the counter control signal shown in FIG. 3, and then counting is started.

By such an operation, the I2S interface 13 seems to operate as a TDM 8-channel of 48 [KHz] per one line from the side of the DACs 15a and 15b and the ADCs 16a and 16b. Thus, an emulation operation of TDM 8-channel output×2 lines and TDM 8-channel input×2 lines is realized in the configuration of FIG. 2.

For example, in order to make it seem that the I2S interface operates as a TDM 16-channel of 48 [KHz] per one line (that is, in a case of m=8), the frame synchronization signal FS may be set to 48 [KHz]×8=384 [KHz] to be supplied to the external counter 14, and the external counter 14 may be caused to generate a frequency-divided frame synchronization signal of ⅛-frequency division.

More generally, in order to perform an emulation operation of the TDM 2m-channel of f [KHz] per line, the frame synchronization signal FS may be set to f [KHz]×m=mf [KHz] to be supplied to the external counter 14, and the LSI 20 may set the frequency division value 1/m in the frequency division circuit 14a and may cause the external counter 14 to generate a frequency-divided frame synchronization signal of 1/m-frequency division (that is, having a frequency of f [KHz]).

Figure 4:
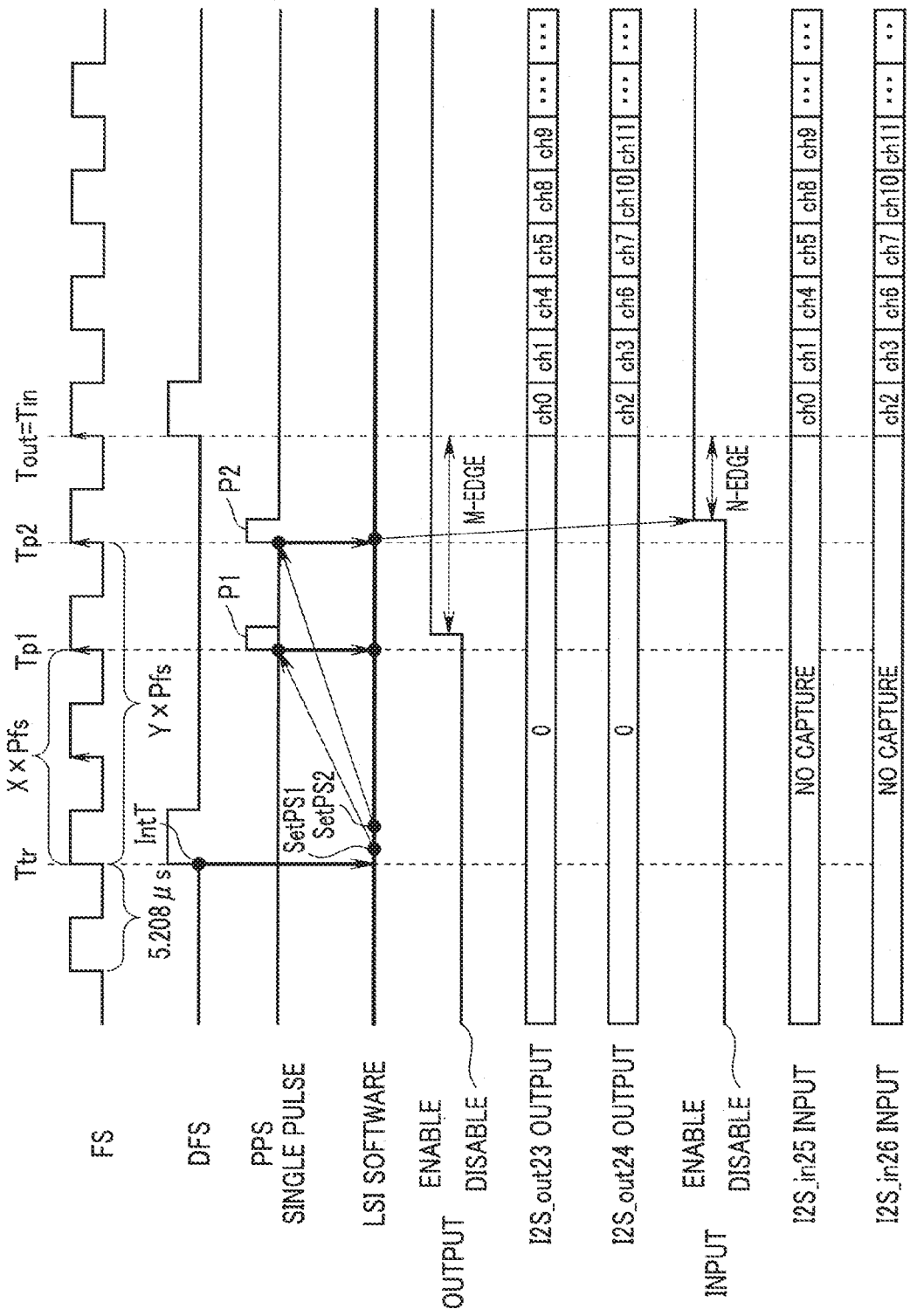
FIG. 4 depicts a timing chart illustrating an input/output start process of audio data in the communication system according to the first embodiment.
Figure 5:
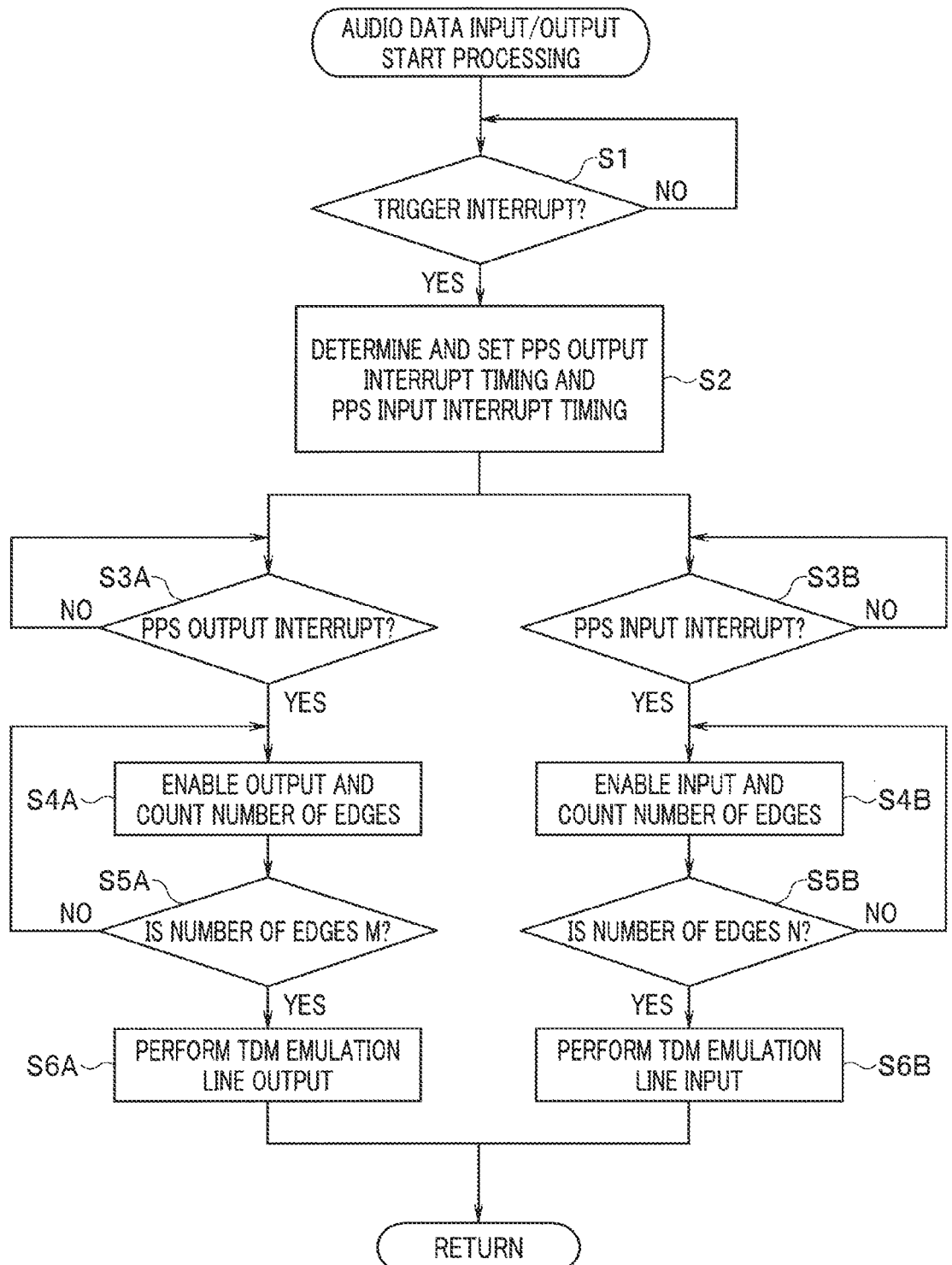
FIG. 5 depicts a flowchart illustrating the input/output start process of audio data in the communication system according to the first embodiment.

FIG. 4 is a timing chart illustrating an input/output start process of audio data in the communication system 1, and FIG. 5 is a flowchart illustrating the input/output start process of audio data in the communication system 1.

The input/output start process of audio data in the communication system 1 will be described based on FIG. 5 with reference to FIG. 4.

When the process shown in FIG. 5 is started, the processor 12 waits (step S1) until the frequency-divided frame synchronization signal DFS generated by the external counter 14, which has received the frame synchronization signal FS, is fed back as a trigger signal (trigger).

When receiving the trigger signal (trigger) at a time Ttr, the processor 12 generates a trigger interrupt IntT and sets the number of pulse edges X to (m-M) by software processing (SetPS1).

Here, X indicates the number of pulse edges (as a specific example, the number of pulse rising edges) of the frame synchronization signal FS from the time Ttr until a first PPS single pulse P1 for enabling the audio data output is generated.

Further, M indicates the number of pulse edges of the frame synchronization signal FS until the audio data is actually output to the line from the I2S interface 13 after the enabling of the audio data output, and is a positive integer value depending on the specification of hardware to be used.

Further, when receiving a trigger signal (trigger) for input at the time Ttr, the processor 12 sets the number of pulse edges Y to (m-N) by the software processing according to the trigger interrupt IntT described above (SetPS2).

Here, Y indicates the number of pulse edges (as a specific example, the number of pulse rising edges) of the frame synchronization signal FS from the time Ttr until a second PPS single pulse P2 for enabling the audio data input is generated.

In addition, N indicates the number of pulse edges of the frame synchronization signal FS until the audio data is actually input to the I2S interface 13 from the line (being captured from the line) after the enabling of the audio data input, and becomes a positive integer value depending on the specification of hardware to be used.

Assuming that the cycle of the frame synchronization signal FS is Pfs, the processor 12 controls the PPS single pulse generation function 11a of the Ethernet interface 11 so as to generate the first PPS single pulse P at a time (Ttr+X×Pfs), that is, a time Tp1 expressed by Equation 1 below (step S2).

$$Tp1 = Ttr + (m-M) \times Pfs \qquad \text{[Equation 1]}$$

Further, the processor 12 controls the PPS single pulse generation function 11a of the Ethernet interface 11 so as to generate the second PPS single pulse P2 at a time (Ttr+Y×Pfs), that is, a time Tp2 expressed by Equation 2 below (step S2).

$$Tp2 = Ttr + (m-N) \times Pfs \qquad \text{[Equation 2]}$$

Specifically, in the present embodiment, since m=4 and Pfs=5.208×1000 [ns] (Pfs=5.208 [μs], but the unit is described in the form of [ns] because nanosecond accuracy is typical), Equations 1 and 2 are expressed by Equations 3 and 4 below, respectively.

$$Tp1 = Ttr + (4-M) \times (5.208 \times 1000 \text{ [ns]}) \qquad \text{[Equation 3]}$$

$$Tp2 = Ttr + (4-N) \times (5.208 \times 1000 \text{ [ns]}) \qquad \text{[Equation 4]}$$

The processor 12 waits until the PPS single pulse generation function 11a generates the first PPS single pulse P1. When the first PPS single pulse P1 is generated, the processor 12 determines that the PPS output interrupt has occurred (step S3A), enables the output, and counts the number of pulse edges of the frame synchronization signal FS after the output is enabled (step S4A).

The processor 12 determines whether the number of edges counted in step S4A becomes M (step S5A), and when the number of edges is less than M, returns to step S4A to count the number of edges again.

On the other hand, when determining that the number of edges becomes M in step SA, the TDM emulation line output, that is, the TDM 8-channel output per line for two lines is performed in synchronization with the frame synchronization signal FS (step S6A). Thus, the timing at which the I2S interface 13 starts outputting the audio data to the DAC 15 is the time Tout synchronized with the frequency-divided frame synchronization signal DFS next to the frequency-divided frame synchronization signal DFS at the time Ttr at which the trigger signal is received, and the output position of the audio data ch0 is also synchronized with the frequency-divided frame synchronization signal DFS.

In addition, the processor 12 performs input processing in parallel with the output processing after performing the process of step S2.

In other words, the processor 12 waits until the PPS single pulse generation function 11a generates the second PPS single pulse P2. When the second PPS single pulse P2 is generated, the processor 12 determines the PPS input interrupt has occurred (step S3B), enables the input, and counts the number of pulse edges of the frame synchronization signal FS after the input is enabled (step S4B).

The processor 12 determines whether the number of edges counted in step S4B becomes N (step S5B), and when the number of edges is less than N, returns to step S4B to count the number of edges again.

On the other hand, when determining that the number of edges becomes N in step S5B, the TDM emulation line input, that is, the TDM 8-channel input per line for two lines is performed in synchronization with the frame synchronization signal FS (step S6B). Thus, the timing at which the audio data is input to the I2S interface 13 from the ADC 16 is the time Tin (in the present embodiment, Tout=Tin) synchronized with the frequency-divided frame synchronization signal DFS next to the frequency-divided frame synchronization signal DFS at the time Ttr at which the trigger signal is received, and the input position of the audio data ch0 is also synchronized with the frequency-divided frame synchronization signal DFS.

After the processes of step S6A and step S6B described above are performed, the process returns to a main process (not shown) to input/output the audio data as shown in FIG. 3.

According to the first embodiment, the I2S (inter-IC sound) interface 13 outputs the 2m-channel audio data to the DAC 15 or receives an input of the 2m-channel audio data from the ADC 16 in synchronization with the frame synchronization signal FS having the frequency that is m times the sampling frequency, and the external counter 14 generates the frame synchronization signal DFS obtained by 1/m-frequency division of the frame synchronization signal FS and outputs the generated signal to the DAC 15 and the ADC 16, to thereby be capable of causing the I2S interface 13 to perform the TDM emulation.

Thus, it is possible to configure a communication device, a communication system, a communication method, and a processing program in which the I2S interface is employed and the audio data of the multi-channel can be input and output.

Further, since the Ethernet interface 11 is further provided to receive/transmit the AVTP frame including the 2m-channel audio data, an audio interface suitable for transmitting/receiving the audio data via the Ethernet line 2 can be configured.

The processor 12 controls the timing when the I2S output interface 13a starts outputting the 2m-channel audio data to the DAC 15 and the timing at which the 2m-channel audio data starts to be input from the ADC 16 to the I2S input interface 13b by using the frequency-divided frame synchronization signal DFS fed back from the external counter 14 as a trigger, which makes the output position and the input position of the audio data ch0 synchronize with the frequency-divided frame synchronization signal DFS.

At this time, when the processor 12 causes the Ethernet interface 11 to generate the first PPS single pulse P1 at the time Tp1 shown in Equation 1 or Equation 3 to enable the audio data output by the PPS output interrupt, the I2S output interface 13a can start outputting the audio data in synchronization with the next frequency-divided frame synchronization signal DFS.

Further, when the processor 12 causes the Ethernet interface 11 to generate the second PPS single pulse P2 at the time Tp2 shown in Equation 2 or Equation 4 to enable the audio data input by the PPS input interrupt, the I2S input interface 13b can start inputting the audio data in synchronization with the next frequency-divided frame synchronization signal DFS.

Thus, the I2S interface 13 can be used as a TDM interface by combining the external counter 14.

In other words, if the external counter 14 is provided in the configuration using the I2S interface 13, to make the setting of the software correspond to the external counter 14, it is possible to transmit and receive the audio data with multi-channels, as in the case of using the TDM interface, without changing the design of the LSI 20 significantly.

Further, the number of channels can be flexibly changed by changing the setting of the external counter 14 and the software, that is, the number of channels is increased from the TDM emulation operation of 8 channels per line to, for example, the TDM emulation operation of 16 channels per line, or conversely, the number of channels is reduced.

Second Embodiment

In a second embodiment, the same components as the components in the first embodiment described above will be denoted by the same reference numerals and descriptions thereof will be omitted appropriately. Differences will be mainly described.

In the above-described first embodiment, using the frequency-divided frame synchronization signal DFS input from the external counter 14 as a common trigger signal, the first PPS single pulse P1 for the PPS output interrupt and the second PPS single pulse P2 for the PPS input interrupt are generated. On the other hand, according to the present embodiment, in the audio data output, the first PPS single pulse P1 for the PPS output interrupt is generated based on a time Tav indicated by the AVTP time stamp.

In other words, the AVTP frame to be transmitted by the node A3 shown in FIGS. 1 and 2 includes a presentation time defined in IEEE 1722. The presentation time corresponds to an AVTP time stamp (avtp_timestamp) in an AVTP frame format and indicates a time of audio data reproduction. Therefore, according to the present embodiment, the AVTP time stamp is used to control an audio data output start timing.

An audio data input start timing in the present embodiment is similar to the audio data input start timing in the above-described first embodiment.

Figure 6:
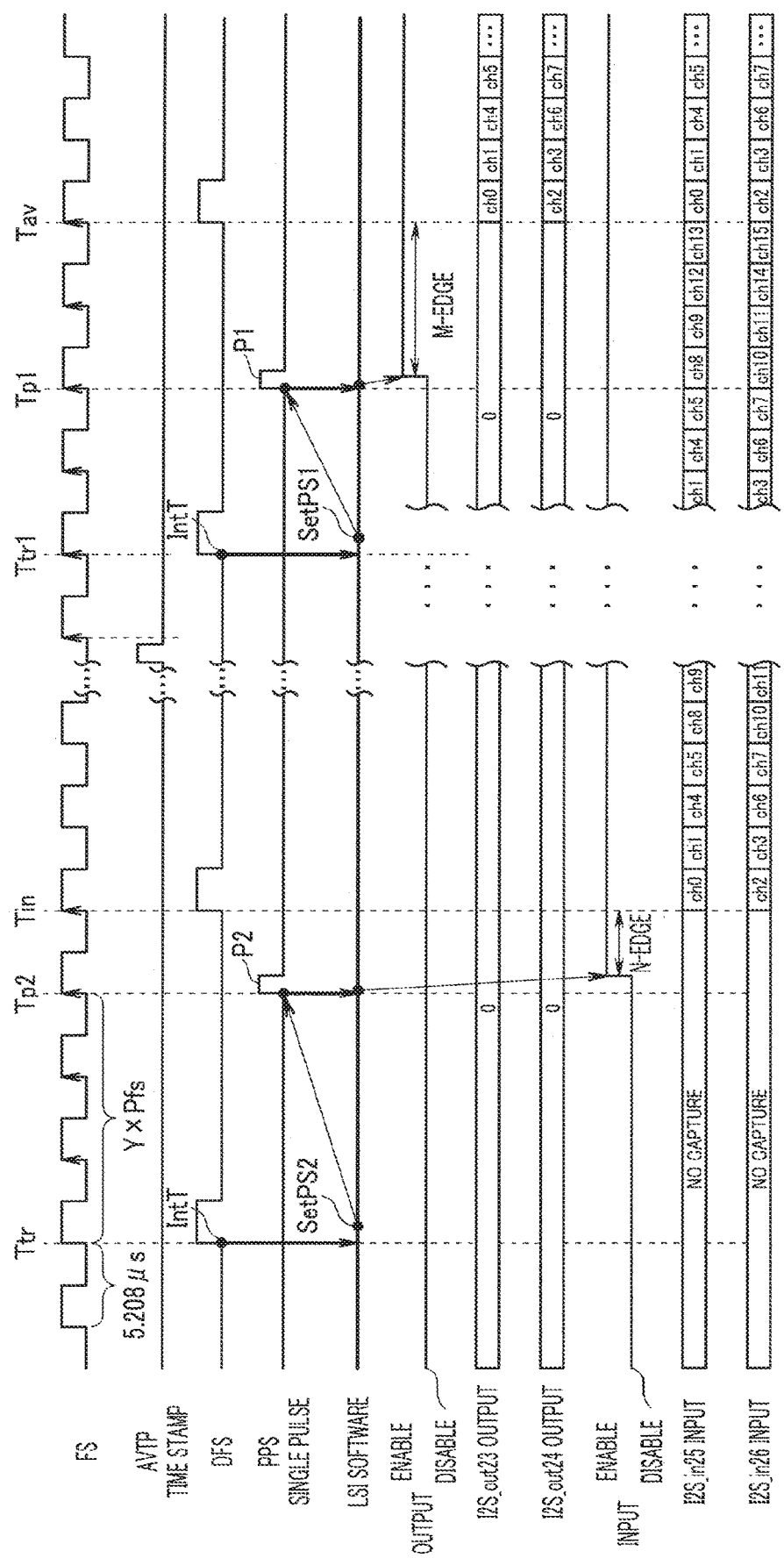
FIG. 6 depicts a timing chart illustrating an output start process of audio data using an AVTP time stamp in the communication system according to a second embodiment.
Figure 7:
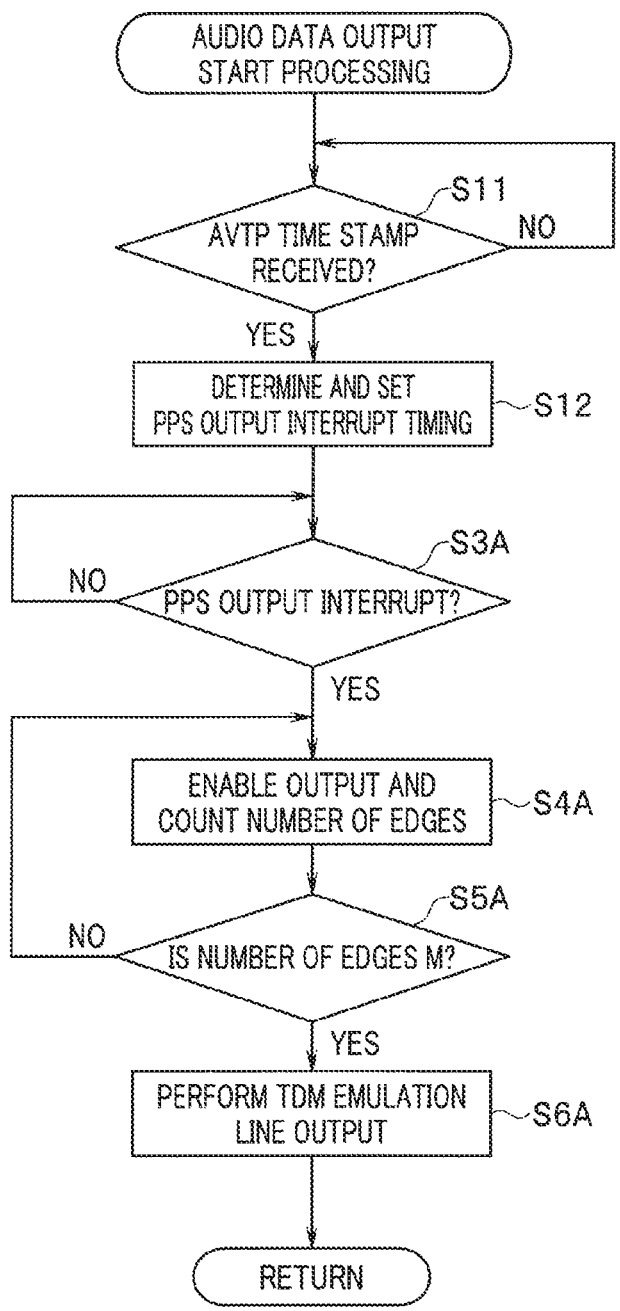
FIG. 7 depicts a flowchart illustrating the output start process of audio data using the AVTP time stamp in the communication system according to the second embodiment.

FIG. 6 is a timing chart illustrating an output start process of audio data using the AVTP time stamp in the communication system 1, and FIG. 7 is a flowchart illustrating the output start process of audio data using the AVTP time stamp in the communication system 1.

The output start process of audio data in the communication system 1 will be described based on FIG. 7 with reference to FIG. 6.

When the process shown in FIG. 7 is started, the processor 12 waits for reception of the AVTP time stamp (step S11).

When the AVTP time stamp is extracted from the AVTP frame received by the Ethernet interface 11, the processor 12 calculates, based on the time Tav indicated by the AVTP time stamp, a generation time Tp1 of the first PPS single pulse P1 for enabling the audio data output, as expressed by Equation 5 below.

$$Tp1=Tav-\text{mod}[Tav,(m\times Pfs)]-M\times Pfs \qquad \text{[Equation 5]}$$

Here, the remainder obtained by dividing the numerical value α by the numerical value β is represented as mod[α,β].

Then, when receiving, at the time Ttr1, a trigger signal (trigger) generated immediately before the time Tav indicated by the AVTP time stamp, the processor 12 generates a trigger interrupt IntT and controls the PPS single pulse generation function 11a of the Ethernet interface 11 so as to generate the first PPS single pulse P1 at the calculated time Tp1 (SetPS1)(step S12).

Equation 5 will be described in detail. First, when mod[Tav, (m×Pfs)]=0, that is, when the time Tav indicated by the AVTP time stamp coincides with a pulse rising time of the frequency-divided frame synchronization signal DFS, the output position of the audio data ch0 can be synchronized with the frequency-divided frame synchronization signal DFS when the audio data is output from the I2S interface 13 to the line at the time Tav. At this time, Equation 5 is transformed into Equation 6 below, and the generation time Tp1 of the first PPS single pulse P1 may be calculated using Equation 6.

$$Tp1=Tav-M\times Pfs \quad \text{[Equation 6]}$$

To give a specific numerical example, since m=4 and Pfs=5.208×1000 [ns] in the present embodiment, the generation time Tp1 of the first PPS single pulse P1 may be calculated according to Equation 7 below in the case of mod[Tav, (4×5.208×1000 [ns])]=0.

$$Tp1=Tav-M\times 5.208\times 1000 \text{ [ns]} \quad \text{[Equation 7]}$$

On the other hand, in the case of mod[Tav, (m×Pfs)]≠0, that is, when the time Tav indicated by the AVTP time stamp deviates from the pulse rising time of the frequency-divided frame synchronization signal DFS, the output position of the audio data ch0 deviates from the frequency-divided frame synchronization signal DFS when the audio data is output from the I2S interface 13 to the line at the time Tav.

Therefore, in this case, as expressed by Equation 8, the remainder mod[Tav, (m×Pfs)] of the time Tav with respect to the frequency-divided frame synchronization signal DFS is subtracted so that the time Tav indicated by the AVTP time stamp is corrected to Tav'.

$$Tav'=Tav-\text{mod}[Tav,(m\times Pfs)] \quad \text{[Equation 8]}$$

Thus, the corrected time Tav' coincides with the pulse rising time of the frequency-divided frame synchronization signal DFS.

Then, based on the corrected time Tav', the generation time Tp1 of the first PPS single pulse P1 may be calculated by Equation 9 below, similarly as in Equation 6.

$$Tp1=Tav'-M\times Pfs \quad \text{[Equation 9]}$$

When Equation 8 is substituted for Equation 9, Equation 5 described above is obtained. Accordingly, Equation 5 can be used for both the case of mod[Tav, (m×Pfs)]=0 and the case of mod[Tav, (m×Pfs)]≠0.

In the specific numerical example as described above, Equation 8 is transformed into Equation 10 below and Equation 9 is transformed into Equation 11 below in the case of mod[Tav, (4×5.208×1000 [ns])]≠0.

$$Tav'=Tav-\text{mod}[Tav,(4\times 5.208\times 1000 \text{ [ns]})] \quad \text{[Equation 10]}$$

$$Tp1=Tav'M\times 5.208\times 1000 \text{ [ns]} \quad \text{[Equation 11]}$$

In the audio data output in FIG. 6, when a system time Ttr1 of the trigger interrupt IntT generated immediately before the time Tav indicated by the AVTP time stamp becomes a value divisible by the cycle (m×Pfs) of the frequency-divided frame synchronization signal DFS, that is, in the case of mod[Ttr1, (m×Pfs)]=0, the generation time Tp1 of the first PPS single pulse P1 may be calculated by Equation 5 described above.

On the other hand, when the time Ttr becomes a value that is not divisible by the cycle (m×Pfs) of the frequency-divided frame synchronization signal DFS due to the influence of the timing deviation and jitter of the media clock start, that is, in the case of mod[Ttr1, (m×Pfs)]#0, the time Tav indicated by the AVTP time stamp is corrected to Tav" as expressed by Equation 12, and then the generation time Tp1 of the first PPS single pulse P1 for enabling the audio data output can be calculated as expressed by Equation 13.

$$Tav''=Tav-\text{mod}[(Tav-Ttr1),(m\times Pfs)]+(m\times Pfs) \quad \text{[Equation 12]}$$

$$Tp1=Tav'-M\times Pfs \quad \text{[Equation 13]}$$

Here, in the specific numerical example as described above, Equation 12 is transformed into Equation 14 below and Equation 13 is transformed into Equation 15 below in the case of mod[Ttr1, (4×5.208×1000 [ns])]≠0.

$$Tav''=Tav-\text{mod}[(Tav-Ttr1),(4\times 5.208\times 1000 \text{ [ns]})]+(4\times 5.208\times 1000 \text{ [ns]}) \quad \text{[Equation 14]}$$

$$Tp1=Tav''-M\times 5.208\times 1000 \text{ [ns]} \quad \text{[Equation 15]}$$

The processor 12 causes the PPS single pulse generation function 11a of the Ethernet interface 11 to generate the first PPS single pulse P1 at the time Tp1 calculated in this way, so that the PPS output interrupt processing of step S3A is performed, and then processes similar to the processes of steps S4A to S6A shown in FIG. 5 are performed.

After the process of step S6A is performed in this way, the process returns to a main process (not shown) to input/output the audio data as shown in FIG. 3.

According to the second embodiment as described above, effects substantially similar to the effects of the first embodiment described above are obtained, and the first PPS single pulse P1 is generated at the time Tp1 expressed by Equation 5, so that it is possible to make the output start position of the audio data to coincide with the frequency-divided frame synchronization signal DFS generated by the external counter 14.

Further, the output start timing of the audio data can be set separately from the input start timing of the audio data.

Then, since the remainder mod[Tav, (m×Pfs)] of the time Tav with respect to the frequency-divided frame synchronization signal DFS is subtracted as expressed by Equation 5 (or Equation 8) when the time Tav indicated by the AVTP time stamp deviates from the pulse rising time of the frequency-divided frame synchronization signal DFS, it is possible to make the output start timing of the audio data to accurately coincide with the pulse rising time of the frequency-divided frame synchronization signal DFS.

In addition, since the generation time Tp1 of the first PPS single pulse P1 is calculated by Equations 12 and 13 when the time Ttr1 of the trigger interrupt IntT becomes the value that is not divisible by the cycle (m×Pfs) of the frequency-divided frame synchronization signal DFS, it is possible to make the output start timing of the audio data to accurately coincide with the pulse rising time of the frequency-divided frame synchronization signal DFS even when the influence of the timing deviation and jitter of the media clock start occurs.

While certain embodiments have been described, these embodiments have been presented by way of example only, and are not intended to limit the scope of the inventions. Indeed, the novel devices described herein may be embodied in a variety of other forms; furthermore, various omissions, substitutions and changes in the form of the devices described herein may be made without departing from the spirit of the inventions. The accompanying claims and their equivalents are intended to cover such forms or modifications as would fall within the scope and spirit of the inventions.

What is claimed is:

1. A communication device comprising:
   a processor configured to execute a media clock for generating a frame synchronization signal having a frequency which is m times a sampling frequency of audio data;
   a first interface configured to output 2m-channel audio data to a digital-to-analog converter (DAC) or receive an input of the 2m-channel audio data from an analogto-digital converter (ADC), in synchronization with the frame synchronization signal; and an external counter configured to receive the frame synchronization signal from the processor, generate a frequency-divided frame synchronization signal obtained by 1/m-frequency division of the frame synchronization signal, and output the frequency-divided frame synchronization signal to the DAC and the ADC, wherein m is an integer of 2 or more.

2. The communication device according to claim 1, further comprising a second interface configured to receive/transmit an AVTP (audio video transport protocol) frame including the 2m-channel audio data.

3. The communication device according to claim 2, wherein the external counter feedbacks the frequency-divided frame synchronization signal to the processor, and the processor controls a timing at which the first interface starts outputting the 2m-channel audio data to the DAC and a timing at which the 2m-channel audio data starts to be input to the first interface from the ADC, using the frequency-divided frame synchronization signal as a trigger.

4. The communication device according to claim 3, wherein the second interface has a function of generating a PPS (pulse per second) single pulse, and when a number of pulse edges of the frame synchronization signal after an audio data output is enabled until the audio data is actually output from the first interface to a line is defined as M, a cycle of the frame synchronization signal is defined as Pfs, and a reception time of the trigger is defined as Ttr, the processor causes the second interface to generate a first PPS single pulse for enabling the audio data output at a time Tp1 which is a time after the time Ttr by a value obtained by multiplying the cycle Pfs by a difference between m and M, and controls the timing at which the first interface starts outputting the 2m-channel audio data to the DAC, based on the first PPS single pulse.

5. The communication device according to claim 4, wherein the processor sets the time Tp1 as follows:

$Tp1=Ttr+(m-M) \times Pfs$.

6. The communication device according to claim 3, wherein the second interface has a function of generating a PPS (pulse per second) single pulse, and when a number of pulse edges of the frame synchronization signal after an audio data input is enabled until the audio data is actually input to the first interface from a line is defined as N, a cycle of the frame synchronization signal is defined as Pfs, and a reception time of the trigger is defined as Ttr, the processor causes the second interface to generate a second PPS single pulse for enabling the audio data input at a time Tp2 which is a time after the time Ttr by a value obtained by multiplying the cycle Pfs by a difference between m and N, and controls the timing at which the 2m-channel audio data starts to be input to the first interface from the ADC, based on the second PPS single pulse.

7. The communication device according to claim 6, wherein the processor sets the time Tp2 as follows:

$Tp2=Ttr+(m-N) \times Pfs$.

8. The communication device according to claim 3, wherein the second interface has a function of generating a PPS (pulse per second) single pulse, and when a number of pulse edges of the frame synchronization signal after an audio data output is enabled until the audio data are actually output from the first interface to a line is defined as M, and a cycle of the fame synchronization signal is defined as Pfs, based on a time Tav indicated by an AVTP time stamp included in the AVTP frame, the processor causes the second interface to generate a first PPS single pulse for enabling the audio data output at a time Tp1 which is a time prior to the time Tav by a sum of a remainder obtained by dividing the time Tav by m times the cycle Pfs and M times the cycle Pfs, and controls the timing at which the first interface starts outputting the 2m-channel audio data to the DAC, based on the first PPS single pulse.

9. The communication device according to claim 8, wherein when a remainder obtained by dividing a numerical value α by a numerical value β is defined as $\mod[\alpha, \beta]$, the processor sets the time Tp1 as follows:

$Tp1=Tav-\mod[Tav,(m \times Pfs)]-M \times Pfs$.

10. The communication device according to claim 9, wherein when a reception time of the trigger immediately before the time Tav is defined as Ttr1, the processor sets the time Tp1 as follows in a case of $\mod[Ttr1, (m \times Pfs)]=0$:

$Tp1=Tav-\mod[Tav,(m \times Pfs)]-M \times Pfs$, and the processor sets the time Tp1 as follows in a case of $\mod[Ttr1, (m \times Pfs)] \neq 0$:

$Tp1=Tav-\mod[(Tav-Ttr1),(m \times Pfs)]+(m \times Pfs)-M \times Pfs$.

11. A communication system comprising:
the communication device according to claim 2;
an Ethernet line connected to the communication device; and
a second communication device connected to the communication device via the Ethernet line, wherein
the communication device receives the AVTP frame from the second communication device via the Ethernet line, and transmits the AVTP frame to the second communication device via the Ethernet line.

12. A communication method comprising:
generating a frame synchronization signal having a frequency which is m times a sampling frequency of audio data;
outputting 2m-channel audio data to a digital-to-analog converter (DAC) or receiving an input of the 2m-channel audio data from an analog-to-digital converter (ADC), in synchronization with the frame synchronization signal;
generating a frequency-divided frame synchronization signal obtained by 1/m-frequency division of the frame synchronization signal; and
outputting the frequency-divided frame synchronization signal to the DAC and the ADC,
wherein m is an integer of 2 or more.

13. A recording medium that is a non-transitory computer-readable recording medium configured to store a processing program, the processing program causing a computer to:

generate a frame synchronization signal having a frequency which is m times a sampling frequency of audio data;

output 2m-channel audio data to a digital-to-analog converter (DAC) or receive an input of the 2m-channel audio data from an analog-to-digital converter (ADC), in synchronization with the frame synchronization signal;

generate a frequency-divided frame synchronization signal obtained by 1/m-frequency division of the frame synchronization signal; and output the frequency-divided frame synchronization signal to the DAC and the ADC, wherein m is an integer of 2 or more.

* * * * *